United States Patent Office 2,699,400
Patented Jan. 11, 1955

2,699,400

NITROCELLULOSE PLASTICIZED WITH DI(BETA-PHENOXYETHYL) DIGLYCOLATE

John D. Brandner, Wilmington, Del., assignor to Atlas Powder Company, Wilmington, Del., a corporation of Delaware No Drawing. Application December 21, 1951, Serial No. 262,887

3 Claims. (Cl. 106—179)

This invention relates particularly to nitrocellulose compositions plasticized with the diphenoxyethyl ester of diglycolic acid.

In copending application Serial No. 158,089, filed April 25, 1950 now Patent No. 2,589,666, of which this application is a continuation-in-part, the diester of beta phenoxyethanol and diglycolic acid is disclosed and claimed. The said diester is believed to correspond in structure and composition with the following formula:

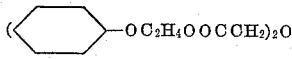

The compound may be readily prepared by the direct esterification of diglycolic acid with beta phenoxyethanol or by other standard techniques of ester formation, as is set forth in detail in the specification of the aforesaid application.

It is the object of the present invention to provide nitrocellulose coating and adhesive compositions, employing as plasticizer therein the said novel diester, in accordance with the generic teaching of the aforesaid copending application.

The coating compositions of the invention comprise nitrocellulose and, as a plasticizer therefor, di(beta phenoxyethyl) diglycolate. Also comprehended are compositions containing, in addition to the nitrocellulose and said plasticizer, synthetic resins, natural resins and gums, pigments, auxiliary plasticizers, and the like, to modify the properties of the coatings in manner well known to the art. Included within the purview of the invention are solutions of the coating compositions in solvents, to form lacquers, cloth coating dopes, and the like.

The nitrocellulose component of the compositions of the present invention may be any of the so-called "soluble" grades and types of commerce. The soluble nitrocelluloses range in nitrogen content from about 10.7% to about 12.2% and in viscosity from less than ¼ second to upwards of several hundred seconds. The selection of an appropriate nitrocellulose for a particular composition will be governed, as is understood by those skilled in the art, by considerations of the purpose of the coating, the method of application intended, the solvent composition to be employed, and the like.

The proportions to cellulose nitrate to the diglycolate diester in the compositions of the invention will vary over a considerable range depending upon the grade or type of nitrocellulose, the intended use of the finished composition, and the presence or absence of modifying resins, auxiliary plasticizers, and the like. Compositions containing as little as 0.1 parts plasticizer and as much as 2 or even more parts plasticizer per part of nitrocellulose may be employed to give useful compositions, although it is preferred to employ from 0.25 to 1.0 parts plasticizer per part of nitrocellulose.

The following examples illustrate the use of the novel plasticizer of the invention in nitrocellulose coating compositions. In the compositions of the examples certain ingredients are designated by trade designations or registered trade-marks. The said ingredients are characterized more fully as follows:

Tolusol 8228 (employed in the solvent of Example I) is a toluene substitute produced by Shell Petroleum Corporation and is believed to be a mixed aliphatic-aromatic hydrocarbon. It boils in the temperature range of 200–225° F., weighs 6.10 to 6.30 pounds per gallon, and has a kauri butanol value of 40–50.

Petrex and Staybelite (employed in Example II) are registered trade-marks of Hercules Powder Company. Petrex 7HT is stated to be a resinous condensation product of a polyhydric alcohol with maleated terpene. Its softening point (by Hercules drop method) is 65° C. and its acid number is 40.

Staybelite is stated to be hydrogenated rosin, saturated by hydrogenation to from 60 to 65% of the theoretical.

Example I

A solution suitable for casting clear films of plasticized nitrocellulose is composed as follows:

| | Parts |
|---|---|
| Di(phenoxyethyl) diglycolate | 4.30 |
| R. S. ½ second in nitrocotton (dry) | 28.41 |
| Ethyl alcohol (SD No. 1) | 15.90 |
| Isopropyl alcohol | 1.75 |
| Toluol | 5.27 |
| Tolusol 8228 | 1.06 |
| Xylol | 7.40 |
| Methyl isobutyl ketone | 8.86 |
| Isopropyl acetate | 10.70 |
| Methyl amyl acetate | 1.75 |
| Butyl acetate | 14.60 |

From such a solution films of 0.030" wet thickness were cast on glass, and the solvent partially evaporated. The films were then lifted from the glass and thoroughly air dried. The dried films were clear, homogeneous and flexible.

Example II

A moisture proofing lacquer for paper, cellophane, and the like, which is heat sealing at elevated temperatures and very resistant to blocking at storage temperatures is the following:

| | Parts |
|---|---|
| 88½ second nitrocotton (dry) | 15.80 |
| 70% Petrex 7HT in ethyl alcohol | 4.76 |
| Dibutyl phthalate | 2.72 |
| Di (beta phenoxyethyl) diglycolate | 8.15 |
| Staybelite | 2.47 |
| Paraffin wax (M. P. 65–70° C) | 0.89 |
| Toluol | 33.33 |
| Butyl acetate | 13.33 |
| Ethyl alcohol (3A) | 5.23 |
| Ethyl acetate | 6.66 |
| Butanol | 6.66 |

Example III

A solution suitable for use as a heat-sensitive adhesive is composed as follows:

| | Parts |
|---|---|
| Nitrocellulose RS, 5 to 6 seconds viscosity | 12 |
| AA castor oil | 2 |
| Dibutyl phthalate | 2 |
| Di (phenoxyethyl) diglycolate | 3 |
| Ethyl alcohol | 6 |
| Butyl alcohol | 12 |
| Butyl acetate | 24 |
| Xylol | 39 |
| | 100 |

This lacquer produces a film of good flexibility and excellent adhesion. It may be used for laminating foil to paper by virtue of its heat sensitive character.

Example IV

A solution suitable for use as a sealing composition for wood or other porous surfaces is composed as follows:

| | Parts |
|---|---|
| Nitrocellulose SS, ¼ second viscosity | 10 |
| Alcohol soluble maleic modified ester gum | 10 |
| AA castor oil | 3 |
| Di (phenoxyethyl) diglycolate | 3 |
| Ethyl alcohol | 39 |
| Butyl alcohol | 10 |
| Ethyl acetate | 10 |
| Ethoxy ethanol | 5 |
| Toluol | 10 |

The above examples are to be considered as illustrative only and not as defining the limits of the invention. Nitrocellulose is the basic film forming resin in a wide variety of coating compositions, especially when suitably compounded with synthetic or natural resins. The novel plasticizer of the present invention is effective in all such compositions, and coatings so plasticized are to be considered within the purview of the invention.

What is claimed is:

1. A nitrocellulose coating composition comprising one part by weight of a soluble nitrocellulose and, as a plasticizer for the nitrocellulose, from about 0.1 to about 1.0 parts by weight of di(beta phenoxyethyl) diglycolate.

2. A nitrocellulose coating composition comprising, per part of soluble nitrocellulose; from about 0.25 to about 1.0 parts by weight of di(beta phenoxyethyl) diglycolate as a plasticizer therefor; and up to about 5 parts by weight of a resin.

3. A nitrocellulose lacquer, the solids of which consist essentially of one part by weight of soluble nitrocellulose; from about 0.25 to about 1.0 parts by weight of di(beta phenoxyethyl) diglycolate, and up to about 5 parts by weight of a resin.

No references cited.